United States Patent [19]

Fukunaga et al.

[11] Patent Number: 4,462,850
[45] Date of Patent: Jul. 31, 1984

[54] PROCESS OF AND APPARATUS FOR MANUFACTURING BLADDERS USED FOR TIRE BUILDING MACHINE

[75] Inventors: Takeshi Fukunaga, Mitaka; Kunio Tajima, Kodaira, both of Japan

[73] Assignee: Bridgestone Tire Company Limited, Tokyo, Japan

[21] Appl. No.: 439,814

[22] Filed: Nov. 8, 1982

[30] Foreign Application Priority Data

Nov. 9, 1981 [JP] Japan .................. 56-179246

[51] Int. Cl.³ .................. B29H 5/18
[52] U.S. Cl. .................. 156/110.1; 156/118; 156/132; 156/401; 264/320; 425/35; 425/501; 425/393; 425/403; 92/92; 92/103 F
[58] Field of Search .............. 156/113, 112, 118, 125, 156/132, 133, 110.1, 401, 412, 416; 92/92, 103 F; 264/299, 320; 425/35, 501, 393, 403; 152/349, 350, 352 R, 352 A, 353, 357 A

[56] References Cited

U.S. PATENT DOCUMENTS

| | | | |
|---|---|---|---|
| 3,671,358 | 6/1972 | Henley et al. | 156/401 |
| 4,087,306 | 5/1978 | Head et al. | 92/92 |
| 4,087,307 | 5/1978 | Head et al. | 156/401 |
| 4,199,393 | 4/1980 | Brown et al. | 156/401 |
| 4,302,274 | 11/1981 | Enders | 156/132 |

Primary Examiner—Lois E. Boland

[57] ABSTRACT

A process of manufacturing a bladder which is to be disposed on each of axially opposite end portions of a tire building machine having a tire building drum, respectively, and is employed for turning back a ply cord bound on the tire building drum of the tire building machine, comprising of the steps of binding a bladder material on a cylindrical member, the bladder material being reinforced with cords and unvulcanized, the cylindrical member having two annular grooves formed in the outer peripheral portion thereof, binding a cloth belt containing water around the outer peripheral surface of the bladder material so that the bladder material is shaped conformingly to the outer peripheral portion of the cylindrical member and the two annular grooves, vulcanizing in a vulcanizing vessel the bladder material to form two annular ridges on the bladder material conformingly to the shape of the annular groove, and taking out the bladder material from the vulcanizing vessel and turning back the bladder material around the lines of the annular ridges formed on the cylindrical member in such a manner that the annular ridge protrudes outwardly of the bladder material.

1 Claim, 7 Drawing Figures

PROCESS OF AND APPARATUS FOR MANUFACTURING BLADDERS USED FOR TIRE BUILDING MACHINE

FIELD OF THE INVENTION

The present invention relates to a process of and an apparatus for manufacturing a bladder which is to be disposed on each of axially opposite end portions of a tire building machine having a tire building drum, and is employed for turning back a ply cord bound on the tire building drum of the tire building machine.

SUMMARY OF THE INVENTION

In accordance with one important aspect of the present invention, there is provided a process of manufacturing a bladder comprising of the steps of (1) binding a bladder material on a cylindrical member, the bladder material being reinforced with cords and unvulcanized, the cylindrical member having two annular grooves formed in the outer peripheral portion thereof, (2) binding a cloth belt containing water around the outer peripheral surface of the bladder material so that the bladder material is shaped conformingly to the outer peripheral portion of the cylindrical member and the two annular grooves, (3) vulcanizing in a vulcanizing vessel the bladder material to form two annular ridges on the bladder material conformingly to the shape of the annular groove, and (4) taking out the bladder material from the vulcanizing vessel and turning back the bladder material around the lines of the annular ridges formed on the cylindrical member in such a manner that the annular ridge protrudes outwardly of the bladder material.

In accordance with another important aspect of the present invention, there is provided an apparatus for manufacturing a bladder, comprising a cylindrical member having at least one annular groove formed in the outer peripheral portion thereof to form at least one annular ridge on the bladder material and having a pair of annular side recesses formed in the side peripheral portion thereof to enable a pair of anchor portions of the bladder material to be anchored therein, and a pair of disk members to be disposed on the axially outer sides of the cylindrical member to fixedly retain the anchor portions of the bladder material between the disk members and the cylindrical member.

DESCRIPTION OF THE PRIOR ART

A steam process and a mold process have so far been known as representative prior-art processes of manufacturing bladders used for a tire building machine.

Referring to FIG. 1 of the drawings, there is shown the steam process which is put into practice by an apparatus comprising a first cylindrical member 1 having an flange portion 2 and a web portion 3 formed with an annular side recess 4. The first cylindrical member 1 is disposed in face-to-face relationship to a second cylindrical member 5 with a disk spacer 6 intervening therebetween. The second cylindrical member 5 has an flange portion 7 having an outer peripheral surface flush with the outer peripheral surface of the flange portion 2 of the first member 1 and a web portion 8 formed with an annular side recess 9 opened in opposing relationship to the annular side recess 4 of the first member 1. Designated by numeral 10 is a bladder material which is to be disposed on the tire building machine and has a bladder body portion 11 and a pair of anchor portions 12 and 13 to be received and anchored in the annular side recesses 4 and 9, respectively. For manufacturing a finished bladder from such a bladder material in the steam process, the anchor portions 12 and 13 are initially anchored into the annular side recesses 4 and 9, respectively, with the disk spacer 6 intervening between the anchor portions 12 and 13, and the bladder body portion 11 is bound on and around the outer peripheral surfaces of the flange portions 2 and 7 of the first and second cylindrical members 1 and 5 in such a manner that axially opposite end portions of the bladder body portion 11 are overlapped to each other. At this time, an annular spacer 14 is accommodated in the bladder body portion 11 in order to prevent the inner surfaces of the bladder body portion 11 from bonding to each other. A cloth belt 15 made of cotton and containing water is then bound around the outer surface of the bladder material 10. The bladder material 10 is brought into a vulcanizing vessel together with first and second cylindrical members 1 and 5 and is vulcanized for a predetermined period of time for production of the finished bladder. The bladder material is taken out of the vulcanizing vessel and is removed from the first and second cylindrical members 1 and 5. In the above mentioned steam process, problems are encountered in that the distance (L) shown in FIG. 3 from the anchor portion 11 of the finished bladder (S) to the axially side end of the tire building machine is not easily able to range within a desired value and the desired qualities of tires are thus not produced, because of the fact that axially opposite end portions of the bladder body portion 11 are overlapped to each other and then the bladder material 10 is brought into the vulcanizing vessel together with first and second cylindrical members 1 and 5.

Referring to FIG. 2 of the drawings, there is shown the mold process which is put into practice by an apparatus comprising a first mold member 21 having an flange portion 22 and a web portion 23 formed with an annular side recess 24. The first mold member 21 is disposed in face-to-face relationship to a second mold member 25 with a disk spacer 26 intervening therebetween. The disk spacer 26 is formed with a fluid passageway 26a having fluid passed therethrough and communicating with a fluid source which generates high and temperature fluid. The second mold member 25 has an flange portion 27 having an outer peripheral surface flush with the outer peripheral surface of the flange portion 22 of the first member 21 and a web portion 28 formed with an annular side recess 29 opened in opposing relationship to the annular side recess 24 of the first member 21. A third mold member 30 comprises a plurality of arcuate segments 31 to be mounted on the first and second mold members 21 and 25. The first and second mold members 21 and 25 are formed with recesses 21a and 25a opened radially outwardly. Likewise, the arcuate segments 31 of the third mold member 30 have respective recesses 31a opened radially inwardly. The recesses 21a, 25a and 31a define in combination a closed chamber 32 when the first, second and third mold members 21, 25 and 30 are assembled to one another as shown in FIG. 2. The first and second flange portions 22 and 27 are formed with a plurality of air passageways 22a and 27a equi-angularly spaced apart from one another and extending from the closed chamber 32 to the outer surfaces of the flange portions 22 and 27 as shown FIG. 2. The arcuate segments 31 of the third mold member 30 has outer surface portions 31b reduced axially outwardly in diameter to be brought into engagement with the inclined surfaces of a pair of rings 33 and 34. A plurality of clamping shafts 35 are adapted to axially extend and pass through a plurality of openings 36 formed in the rings 33 and 34 so that the arcuate segments 31 of the third mold members 30 are closely fitted to the flange portions 22 and 27 of the first and second mold members 21 and 25 by means of threaded portions 35a formed at the axially opposite end portions of the shafts 35 and clamping nuts 37 in threaded engagement with the threaded portions 35a of the shafts 35. For manufacturing a finished bladder from such a bladder material in the above mentioned mold process, the anchor portions 12 and 13 of the bladder material 10 are initially anchored into the annular recesses 24 and 29, respectively, with the disk spacer 26 intervening between the anchor portions 12 and 13, and the bladder body portion 11 is bound on and around the outer peripheral surfaces of the flange portions 22 and 27 of the first and second mold members 21 and 25 in such a manner that axially opposite end portions of the bladder body portion 11 are overlapped to each other. The arcuate segments 31 of the third mold member 30 are then closely fitted to the flange portions 22 and 27 of the first and second mold members 21 and 25 by means of the rings 33, 34 and the shafts 35. Thereafter, high pressure and temperature fluid is introduced into the closed chamber 32 through the fluid passageway 26a of the disk spacer 26 so that the bladder body portion is expanded in the closed chamber 32 conformingly to the inner surfaces of the first, second and third mold members 21, 25 and 31. In the mold process, there are encountered disadvantages such that an advanced technique and tedious labors are required for production of the finished bladder and the finished bladders are insufficient in strength and the cords embedded in the bladder material 10 can not be arranged in paralell with one another for the reason that there occurs uneven contraction in the cords resulting from the high pressure and temperature fluid introduced into the bladder material 10 while the bladder material 10 is being vulcanized. Furthermore, the finished bladder is uneven in thickness and liable to be punctured since a part of the bladder material is forced into the air passageways 22a and 27a and thus results in burrs on the produced bladder.

BRIEF DESCRIPTION OF THE DRAWINGS

The drawbacks of prior-art processes of manufacturing a bladder used for a tire building machine and the features and advantages of the process of manufacturing a bladder according to the present invention will be understood from the accompanying drawings in which.

DESCRIPTION OF THE PREFERRED EMBODIMENTS

Figure 1:
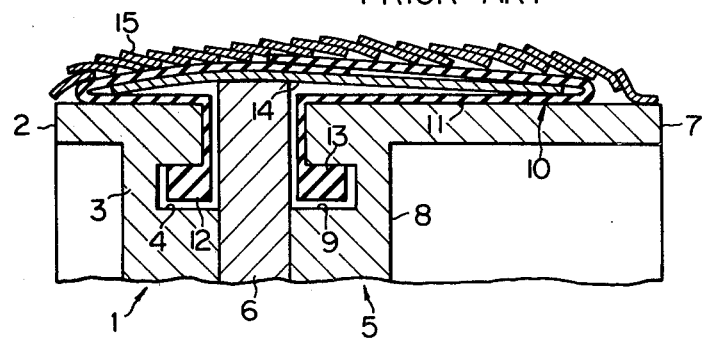
FIG. 1 is a fragmentary cross sectional view showing an apparatus which is employed to put into practice a process of manufacturing a bladder according to a prior-art steam process.
Figure 2:
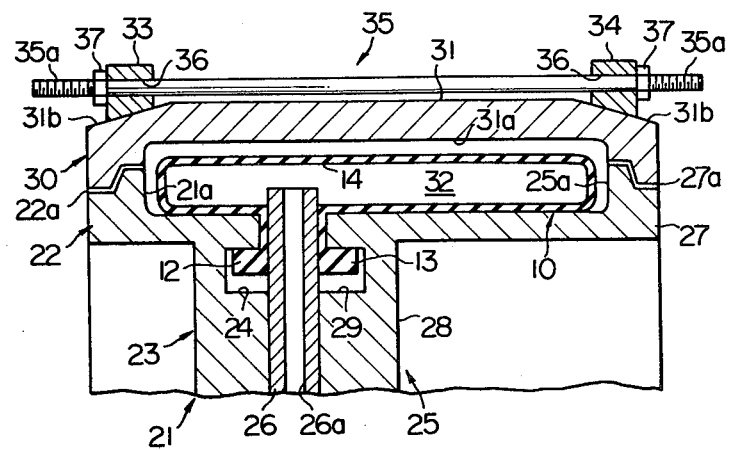
FIG. 2 is a fragmentary cross sectional view showing an apparatus which is employed to put into practice a process of manufacturing a bladder according to another prior-art mold process.
Figure 3:
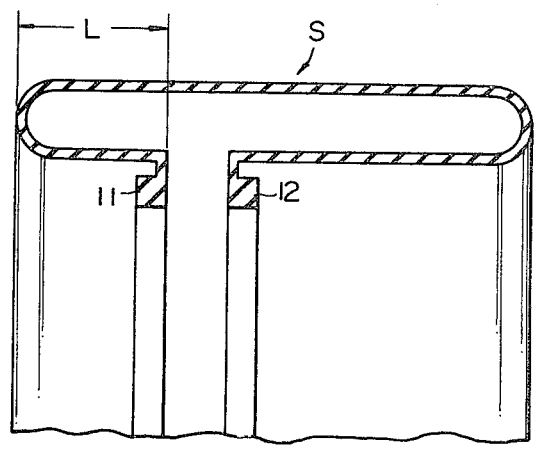
FIG. 3 is a cross sectional view of the bladder manufactured by the steam process.
Figure 4:
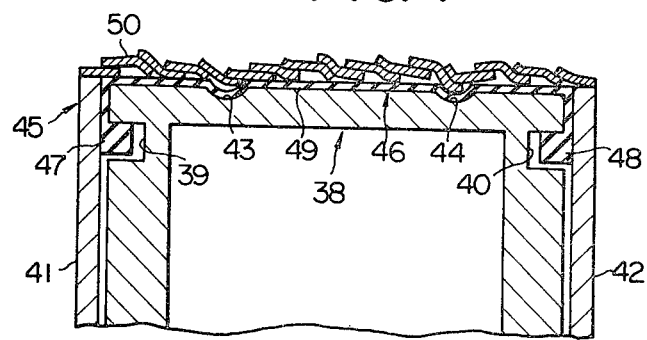
FIG. 4 is a fragmentary cross sectional view showing an apparatus which is employed to put into practice a process of manufacturing a bladder according to the present invention.

In FIG. 4 is shown one preferable embodiment of an apparatus for manufacturing bladders put into practice in accordance with the process of the present invention. Designated by numeral 38 is a cylindrical member having annular side recesses 39 and 40 formed in side peripheral portions thereof to which a pair of disks 41 and 42 are to be attached. The cylindrical member 38 further has annular grooves 43 and 44 formed in the outer peripheral portion thereof, the grooves 43 and 44 being formed respectively at predetermined distances from the axially opposite ends of the cylindrical member 38. The cylindrical member 38 and the disks 41 and 42 constitute as a whole an apparatus 45 for manufacturing a bladder used with a tire building machine, the apparatus 45 being able to be transferred into a vulcanizing vessel by means of transfer means not shown in the drawings.

Figure 5:
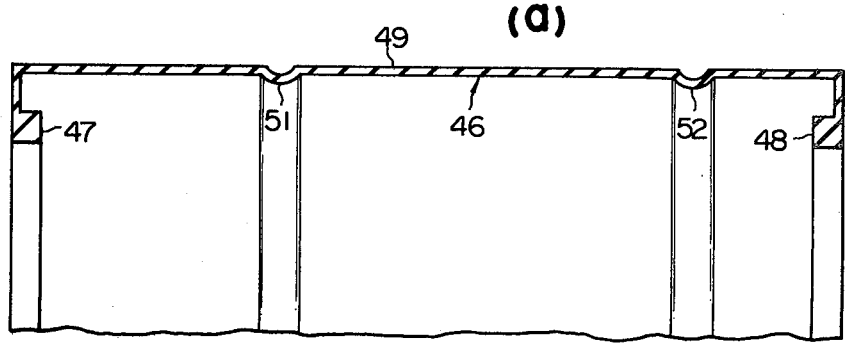
FIGS. 5 (a) (b) (c) are fragmentary cross sectional views for explaining the steps of deforming the vulcanized bladder material produced by the process of manufacturing a bladder according to the present invention.
Figure 5:
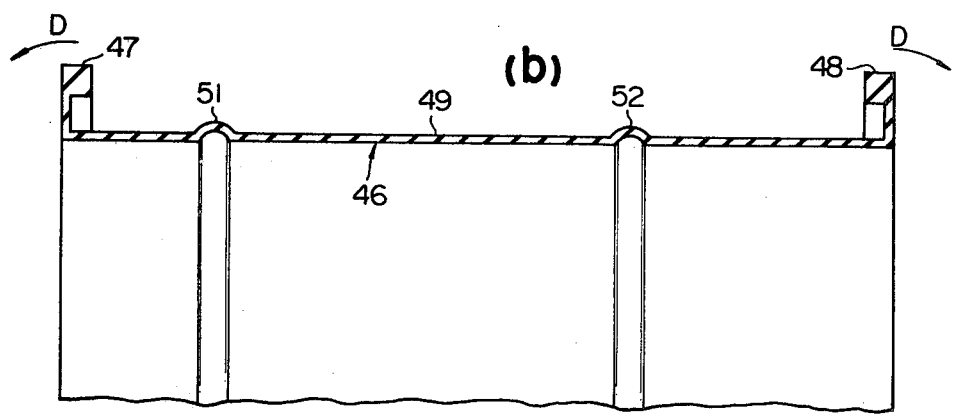
Figure 5:
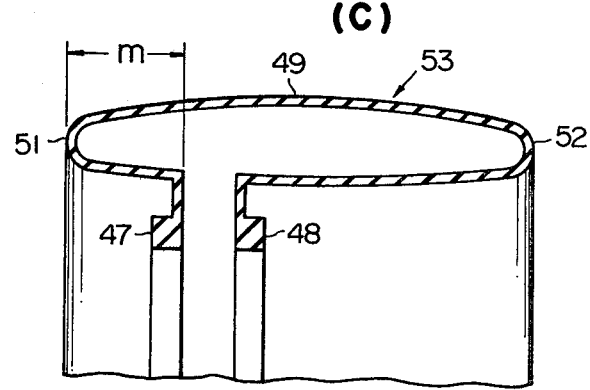

The process of manufacturing bladders by means of the apparatus 45 thus constructed will now be described. A bladder material 46 reinforced with cords and vulcanized is bound around the cylindrical member 38 which is placed outside of the vulcanizing vessel and from which disk members 41 and 42 are already detached. Anchor portions 47 and 48 of the bladder material 46 are received in the grooves 39 and 40, and a body portion 49 of the bladder material 46 is then bound on and around the outer peripheral portion of the cylindrical member 38. After completion of binding the bladder material 46 on the cylindrical member 38, the disks 41 and 42 are respectively attached to the side peripheral portions of the cylindrical member 38 in such a way that the bladder material 46 is fixedly received and supported between the disks 41 and 42 and the side peripheral portions of the cylindrical member 38. On the outer peripheral portion of the bladder material 46 is bound a cloth belt 50 containing water to make the bladder material 46 tightly bound on the cylindrical member 38. As a consequence, the bladder material 46 is tightly bound along the outer peripheral portion of the cylindrical member 38 and the annular side grooves 43 and 44 of the cylindrical member 38 so as to be shaped conformingly to the outer peripheral portion of the cylindrical member 38 and the annular side grooves 43 and 44 as will be better understood from FIG. 4. In this instance, after completion of binding the cloth belt 50 containing water on the outer peripheral portion of the bladder material 46, a resilient member such as for example a rubber may be bound on the cloth belt 50 so that the bladder material 46 is shaped conformingly to the outer peripheral portion of the cylindrical member 38 and the annular grooves 43 and 44. The apparatus 45 having the bladder material 46 bound thereon is transferred into the vulcanizing vessel by means of transfer means not shown in the drawings and the bladder material 46 is then vulcanized for a predetermined period of time. While being vulcanized in the vulcanizing vessel, the bladder material 46 is more tightly bound on the cylindrical member 38 because of the fact that water in the cloth belt 50 is evaporated due to the high temperature in the vulcanizing vessel. After completion of the step of vulcanization, the apparatus 45 having the bladder material 46 bound thereon is taken out from the vulcanizing vessel, and the cloth belt 50 and the disks 41 and 42 are removed from the cylindrical member 38. After the bladder material 46 is thus removed from the cylindrical member 38, annular ridges 51 and 52 have been formed in the bladder material 46 resulting from the shapes of the annular grooves 43 and 44 formed in the cylindrical member 38 as shown in FIG. 5(a). The bladder material 46 is turned inside out as shown in FIG. 5(b) and then the anchor portions 47 and 48 of the bladder material 46 is turned back in the direction D indicated in FIG. 5(b) so that the bladder material 46 is turned back around the lines of the annular ridges 51 and 52 and deformed into a finished bladder 53 as shown in FIG. 5(c). Since the annular ridges 51 and 52 are formed by means of the shapes of the annular grooves 43 and 44 which are respectively formed in the cylindrical member 38 at predetermined distances from the axially opposite ends of the cylindrical member 38, the distance (m) shown in FIG. 5 (c) from the anchor portion 47 of the finished bladder 53 to the lateral end of a tire building machine is able to be obtained within a predetermined value. In addition, there are caused no disadvantages such that the bladder 46 is insufficient in strength and is not uniform in thickness due to the uneven contraction of the cord embedded in the bladder material 46, because of the fact that the bladder material 46 is vulcanized in the vulcanizing vessel. Furthermore, the bladder 53 is able to be manufactured in a relatively short period of time and without an advanced technique.

As previously described, the process of manufacturing bladders according to the present invention is advantageous to enable an unskilled worker to manufacture in a relatively short period of time high quality bladders for use with tire building machine.

While it has been described in the above mentioned embodiment that the cylindrical member is formed with two annular grooves in the outer peripheral portion thereof, the cylindrical member may be formed with one annular groove in the outer peripheral portion thereof according to the present invention.

What is claimed is:

1. A process of manufacturing a bladder which is to be disposed on each of axially opposite end portions of a tire building machine having a tire building drum, respectively, and employed for turning back a ply cord bound on the tire building drum of the tire building machine, comprising of the steps of:

binding a bladder material on a cylindrical member, the bladder material being reinforced with cords and unvulcanized, the cylindrical member having two annular grooves formed in the outer peripheral portion thereof, binding a cloth belt containing water around the outer peripheral surface of said bladder material so that said bladder material is shaped conformingly to the outer peripheral portion of said cylindrical member and said two annular grooves, vulcanizing in a vulcanizing vessel said bladder material to form two annular ridges on said bladder material conformingly to the shape of said annular grooves, and taking out said bladder material from the vulcanizing vessel and turning back said bladder material around the lines of said annular ridges formed on said cylindrical member in such a manner that said annular ridges protrude outwardly of said bladder material.

* * * * *